(12) United States Patent
Kurihara

(10) Patent No.: US 10,491,764 B2
(45) Date of Patent: Nov. 26, 2019

(54) INFORMATION-PROCESSING APPARATUS, CONTROL METHOD OF INFORMATION-PROCESSING APPARATUS, PROGRAM, RECORDING MEDIUM, PORTABLE TERMINAL, AND INFORMATION-PROCESSING SYSTEM

(71) Applicant: CANON KABUSHIKI KAISHA, Tokyo (JP)

(72) Inventor: Shukei Kurihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/721,059

(22) Filed: Sep. 29, 2017

(65) Prior Publication Data

US 2018/0027135 A1 Jan. 25, 2018

Related U.S. Application Data

(63) Continuation of application No. 15/203,689, filed on Jul. 6, 2016, now Pat. No. 9,807,264, which is a
(Continued)

(30) Foreign Application Priority Data

Mar. 25, 2014 (JP) .................................. 2014-061959

(51) Int. Cl.
*H04B 5/00* (2006.01)
*H04N 1/00* (2006.01)
(Continued)

(52) U.S. Cl.
CPC ..... *H04N 1/00477* (2013.01); *H04N 1/00307* (2013.01); *H04N 1/21* (2013.01);
(Continued)

(58) Field of Classification Search
CPC .... H04W 4/008; H04W 36/0033; H04N 1/21; H04B 5/0031; G06F 3/1292
See application file for complete search history.

(56) References Cited

U.S. PATENT DOCUMENTS 6,483,999 B1 * 11/2002 Andersen ............. H04N 1/0035
399/87
6,886,028 B1 * 4/2005 Matsuyama .......... G06F 3/1207
358/1.15
(Continued)

FOREIGN PATENT DOCUMENTS

JP 2013-214806 A 10/2013

*Primary Examiner* — Tuan Pham
(74) *Attorney, Agent, or Firm* — Canon U.S.A., Inc. IP Division

(57) ABSTRACT

An MFP specifies an MFP application to be started in a portable terminal and another application to be started after start of the MFP application. An NFC tag records information that allows the specified MFP application and the specified another application to be identified in the portable terminal. The portable terminal acquires the application information recorded in the NFC tag by the proximity wireless communication. The portable terminal controls a communication-connection changeover according to an application to be started based on the acquired information. At this moment, if a type of communication to be used by the MFP application and a type of communication to be used by the another application are different, the portable terminal starts the another application after making a changeover to communication connection corresponding to this another application.

11 Claims, 12 Drawing Sheets

Related U.S. Application Data continuation of application No. 14/666,913, filed on Mar. 24, 2015, now Pat. No. 9,414,185.

(51) Int. Cl.
  *H04W 4/80* (2018.01)
  *H04W 36/00* (2009.01)
  *H04N 1/21* (2006.01)
  *H04W 36/14* (2009.01)

(52) U.S. Cl.
  CPC ......... *H04W 4/80* (2018.02); *H04W 36/0033* (2013.01); *H04N 2201/0093* (2013.01); *H04N 2201/0094* (2013.01); *H04W 36/14* (2013.01)

(56) References Cited

U.S. PATENT DOCUMENTS

| | | | |
|---|---|---|---|
| 2011/0129238 A1* | 6/2011 | Muranaka | G03G 15/55 399/12 |
| 2014/0240776 A1* | 8/2014 | Suzuki | G06F 3/1296 358/1.15 |

\* cited by examiner

FIG. 8

| Display UI | Application to be started | Wi-Fi handover |
|---|---|---|
| RUI | Browser | Necessary |
| FAX transmission | MFP application | Unnecessary |
| FAX reception | FAX viewer | Necessary |
| Print | Print application | Necessary |
| Scan | MFP application | Necessary |

FIG. 11

| Device status | UI status | Display UI |
|---|---|---|
| ADF document present | FAX transmission screen | FAX transmission |
| N/A | Device setting screen | RUI (setting screen) |
| Secure job | N/A | RUI (print instruction screen) |
| ADF document present | Remote scan screen | Scan |

INFORMATION-PROCESSING APPARATUS, CONTROL METHOD OF INFORMATION-PROCESSING APPARATUS, PROGRAM, RECORDING MEDIUM, PORTABLE TERMINAL, AND INFORMATION-PROCESSING SYSTEM

CROSS REFERENCE

The present application is a Continuation of U.S. patent application Ser. No. 15/203,689 filed Jul. 6, 2016 which claims the benefit of U.S. patent application Ser. No. 14/666,913 filed Mar. 24, 2015, which claims the benefit of Japanese Patent Application No. 2014-061959 filed Mar. 25, 2014, which are hereby incorporated by reference herein in its entirety.

BACKGROUND

Field of the Disclosure

The present disclosure relates to a method for starting an application in a portable terminal, performed in an information-processing apparatus and the portable terminal, by using proximity wireless communication.

Description of the Related Art

In recent years, portable terminals including so-called smartphones have become widespread. The smartphones are multifunctional portable telephones having high affinities for the Internet and produced based on techniques of personal computers. In addition, a large number of software development kits (SDKs) have been made available. The SDKs are provided to develop applications (hereinafter may also be simply referred to as "app") that can be used in portable terminals. These situations are forming an environment where developers can freely develop applications for portable terminals and distribute the developed applications.

For example, applications for operating a printer, a fax, or a multifunction peripheral (MFP) with these functions (i.e., MFP applications) from a portable terminal have also been developed using SDKs and made available. A user can use various functions of an MFP, by starting a MFP application in a portable terminal. In general, an application to be used in a portable terminal (an application for a mobile) is often created as an application for a single function. Therefore, a user operating a MFP from a portable terminal needs to operate the basic functions of the MFP via an MFP application, and to start other applications when intending to use extension functions, in many cases.

Meanwhile, near field communication (NFC) that is an example of proximity wireless communication (noncontact communication) have become widespread in various fields. Functions of NFC are implemented by, for example, a device mounted with an NFC unit configured to include components such as an NFC tag and an NFC reader/writer. Between the devices each mounted with the NFC unit, a communication session is established by merely bringing these devices close to each other to be within a few centimeters. The communication session ends when these devices are moved away from each other. In this way, a communication session is established/terminated by merely bringing the devices close to/moving the devices away from each other. Therefore, NFC has been attracting attention as a convenient way that allows users to easily use various services, and NFC is being put to practical use, in various fields.

For example, assume that an image forming apparatus has an NFC tag recording status information of a device, and a portable terminal has a reader (a NFC reader) for reading the information recorded in the NFC tag. In such a system configuration, when a user desires to confirm the status of a device, the user can easily acquire detailed information of the device by merely holding a portable terminal over the device, i.e., by merely bringing the portable terminal close to the device.

The NFC tag may be configured as a component in which various kinds of information can be written. Examples of such information include a uniform resource identifier (URI) scheme (e.g., http), a service set identifier (SSID), and an encryption key.

For example, upon reading the NFC tag recording such information, a portable terminal automatically starts a predetermined application, or executes Wi-Fi handover processing. The Wi-Fi handover processing automatically causes a connection changeover from one communication standard to another of a different type, e.g., from 3G communication to wireless local area network (LAN) communication.

For example, Japanese Patent Application Laid-Open No. 2013-78035 discusses a portable terminal. This portable terminal acquires function selection information from a MFP, after starting an NFC communication session upon being brought close to the MFP. The portable terminal then terminates temporarily the NFC communication session upon being moved away from the MFP, so that a user performs operation such as manually designating a setting item. When being brought close to the MFP again, the portable terminal starts an NFC communication session, thereby instructing the MFP to execute a job according to the setting item.

However, information about applications that can be written in an NFC tag is limited to one. Therefore, the user needs to change a screen for an application according to a job desired to be executed in the MFP, or needs to start another application according to a job. The user may also need to start another application that requires connection to wireless LAN communication of Fi-Wi (registered trademark) or the like, depending on the job desired to be executed in the MFP.

In this case, it is necessary to include, for example, a program for Wi-Fi handover processing, to make a communication-connection changeover for each application provided in the portable terminal. As a result, an application size becomes relatively large thereby requiring a large part of the capacity of a storage device of the portable terminal, which is a problem remaining unsolved. In the first place, the Wi-Fi handover processing cannot be performed on the application side, for a browser or the like built in a portable terminal. Therefore, the user needs to make a changeover manually, for example, from portable-telephone communication to wireless LAN communication, whenever necessary.

SUMMARY

The present disclosure is directed to an information-processing system capable of reducing complicated work such as an application changeover according to processing contents and a communication-connection changeover due to the application changeover.

According to an aspect of the present invention, an information-processing system includes an information-processing apparatus and a portable terminal configured to be capable of communicating with each other by proximity wireless communication, wherein the information-processing apparatus includes a specifying unit configured to specify a first application to be started in the portable terminal and a second application to be started after start of the first application, and a recording unit configured to record application information in a storage unit, the application information allowing the specified first application and the specified second application to be identified in the portable terminal, wherein the portable terminal includes an acquisition unit configured to acquire the application information recorded in the storage unit, by the proximity wireless communication, and a control unit configured to control a communication-connection changeover according to an application to be started based on the acquired information, and wherein, when a type of communication to be used by the first application and a type of communication to be used by the second application are different, the control unit starts the second application after making a changeover to communication connection corresponding to the second application.

Further features of the present invention will become apparent from the following description of exemplary embodiments with reference to the attached drawings.

BRIEF DESCRIPTION OF THE DRAWINGS

FIG. 8 is a diagram illustrating an example of a data table held by an MFP application.

FIG. 11 is a diagram illustrating an example of a data table held by an MFP application.

DESCRIPTION OF THE EMBODIMENTS

Exemplary embodiments of the present invention will be described in detail with reference to the drawings. These exemplary embodiments will be each described using a case where the present invention is used for an information-processing system including a portable terminal and a multifunction peripheral (MFP). Examples of the portable terminal include a smartphone and a tablet personal computer (PC). The MFP is an example of an information-processing apparatus and has functions such as a printer and a fax. In addition, the description will be given using, as an example, a case where Wi-Fi (registered trademark) communication is employed for communication connection to be used by another application to be started in the portable terminal. Moreover, the portable terminal and the information-processing apparatus are configured to be capable of communicating with each other by near field communication (NFC) that is an example of proximity wireless communication (noncontact communication).

Figure 1:
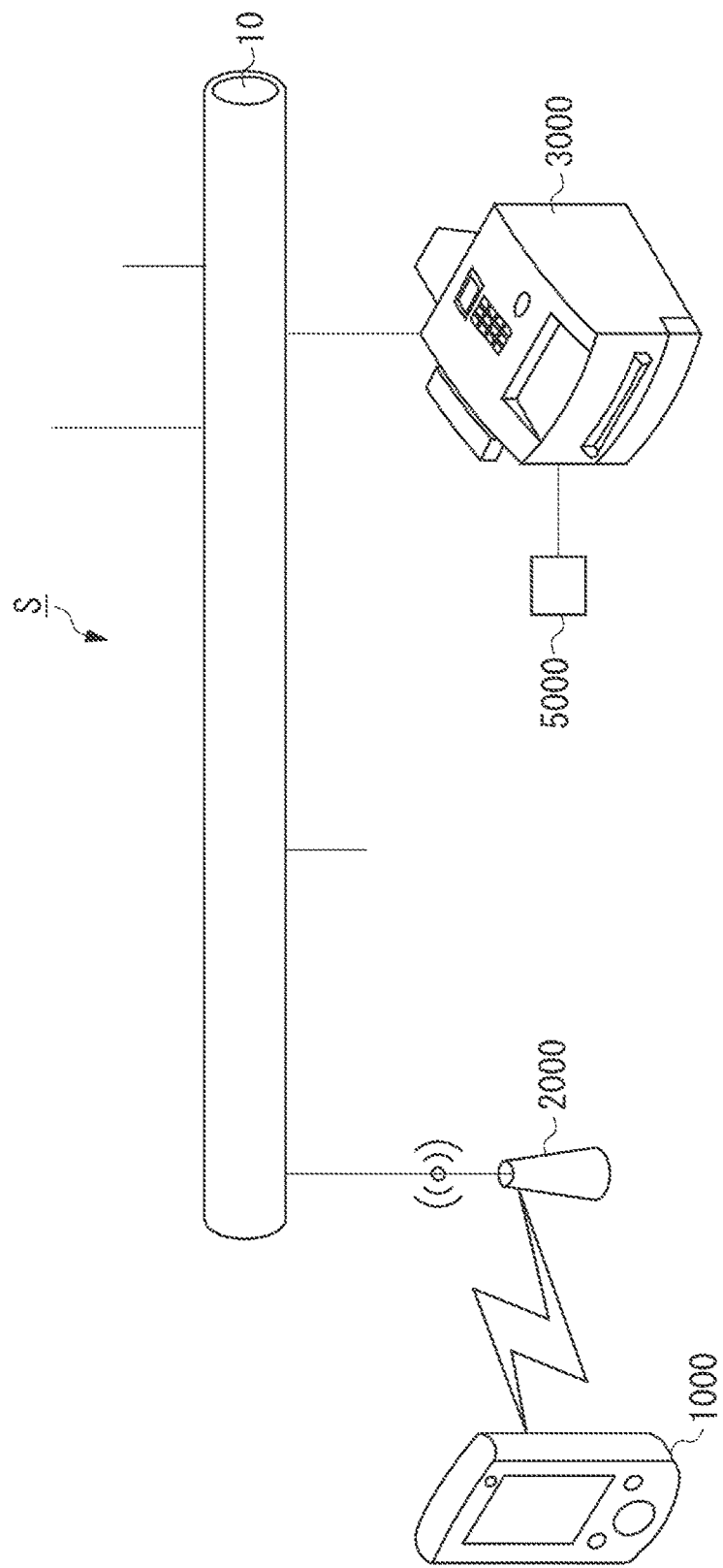
FIG. 1 is a diagram illustrating an example of a configuration of an information-processing system according to a first exemplary embodiment.

FIG. 1 is a diagram illustrating an example of a configuration of an information-processing system S according to a first exemplary embodiment.

The information-processing system S illustrated in FIG. 1 includes a network line 10, a portable terminal 1000, an access point 2000, an MFP 3000, and an NFC tag 5000.

The portable terminal 1000 is, for example, an information device such as a smartphone and a tablet personal computer (PC). The portable terminal 1000 is connected to the network line 10 via the access point 2000 having a function of relaying wireless local area network (LAN) communication.

The MFP 3000 is, for example, a multifunction peripheral having functions such as a printer and a fax, and is connected to the network line 10. Further, the MFP 3000 is configured to operate according to a command output by a user starting an application installed on the portable terminal 1000, and operating this application. The MFP 3000 can also be configured to make connection to the network line 10 via the access point 2000, as with the portable terminal 1000.

The NFC tag 5000 can record various kinds of information. Examples of these various kinds of information include information for identifying an application to be started automatically in the portable terminal 1000 with which a communication session has been established, and information about a communication-connection changeover, e.g., Wi-Fi (registered trademark) handover processing. The information recorded in the NFC tag 5000 is to be read using, for example, an NFC reader/writer of the portable terminal 1000. In this way, the NFC tag 5000 forms a storage unit that records various kinds of information.

A hardware configuration of each of the portable terminal 1000 and the MFP 3000 will be described in detail below.

Figure 2:
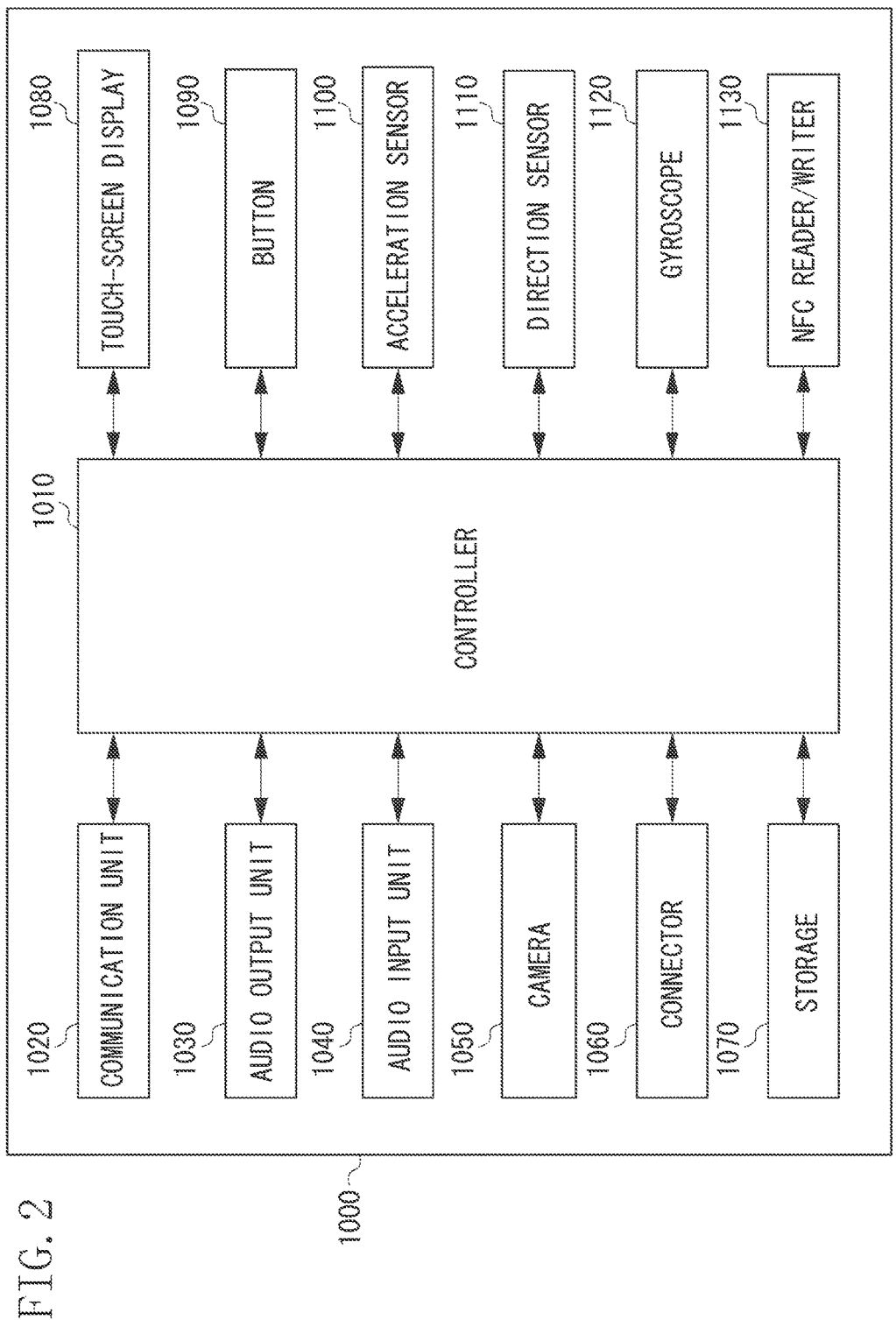
FIG. 2 is a block diagram illustrating an example of a hardware configuration of a portable terminal.

FIG. 2 is a block diagram illustrating an example of the hardware configuration of the portable terminal 1000.

The portable terminal 1000 illustrated in FIG. 2 includes a controller 1010, a communication unit 1020, an audio output unit 1030, an audio input unit 1040, a camera 1050, a connector 1060, a storage 1070, and a touch-screen display 1080. The portable terminal 1000 further includes a button 1090, an acceleration sensor 1100, a direction sensor 1110, a gyroscope 1120, and an NFC reader/writer 1130.

The controller 1010 is, for example, one type of computer including a central processing unit (CPU), and comprehensively controls operation of the portable terminal 1000. In this way, the controller 1010 functions as a control unit provided to implement various functions of the portable terminal 1000. The controller 1010 may be configured as, for example, an integrated circuit such as a system-on-a-chip (SoC) integrated to include other components such as the communication unit 1020.

The communication unit 1020 is a module provided to communicate with other devices via the access point 2000. The communication unit 1020 performs, for example, communication according to the type of wireless communication of 2G, 3G, 4G, and the like that are wireless communication standards for portable telephones. The communication unit 1020 may also be configured to perform communication according to the type of wireless communication such as Wi-Fi (Institute of Electrical and Electronics Engineers (IEEE) 802.11), Worldwide Interoperability for Microwave Access (WiMAX, registered trademark), and NFC. The communication unit 1020 may also be configured to provide support, while making a changeover of one of or two or more of the above-described communication standards of different types.

The audio output unit 1030 is, for example, a speaker, and outputs, as audio, a voice signal received from the controller 1010.

The audio input unit 1040 is, for example, a microphone. The audio input unit 1040 converts received audio into a voice signal, and transmits the voice signal resulting from the conversion to the controller 1010.

The camera 1050 is an out-camera for photographing an object, and includes, for example, a charge coupled device (CCD).

The connector 1060 is a terminal that mediates connection with other devices. The connector 1060 may be, for example, a general-purpose terminal such as a Universal Serial Bus (USB) connector and an earphone microphone connector, according to a device to be connected to the portable terminal 1000. The connector 1060 may also be a terminal subjected to dedicated design such as a dock connector. The devices to be connected to the portable terminal 1000 via the connector 1060 include, for example, an external storage, a speaker, and a communication apparatus.

The storage 1070 is a device that stores various programs to be executed by the controller 1010 and various data including setting data. The storage 1070 is also used as a work area for temporarily storing a result of processing performed by the controller 1010.

The storage 1070 can be configured using any storage device such as a semiconductor storage device or a magnetic storage device, or can be configured to include one or more kinds of storage device. The storage 1070 can also be configured by combining a portable storage medium such as a memory card, with a reader for this storage medium.

The programs stored in the storage 1070 include an application to be executed in the foreground or background, and a control program for supporting operation of the application.

The application is a program defined so that predetermined processing is executed via the controller 1010. For example, execution of the application allows a predetermined screen to appear on, for example, a display screen of the touch-screen display 1080. Further, the execution of the application allows control for detection of operation (gesture operation) performed by a user on this screen, and for execution of processing according to a result of the detection.

The control program is, for example, an operating system (OS) provided to primitively control each function unit of the portable terminal 1000, and to start the application of the portable terminal 1000. For example, the controller 1010 controls units such as the communication unit 1020, the audio output unit 1030, and the audio input unit 1040, based on the control program, to implement a phone call.

The application and the control program can be stored in the storage 1070 beforehand, or can each be installed onto the storage 1070 via the communication unit 1020.

The touch-screen display 1080 functions as a display unit that displays graphics such as text, image, and diagram on the display screen. The touch-screen display 1080 also functions as an operation receiving unit that detects operation performed by a user on the display screen. Examples of the operation include tapping and flicking via a finger or a stylus pen.

The button 1090 represents one or more buttons to be operated by a user. The controller 1010 detects operation (such as a click, a double click, and a push) performed by the user on the button 1090. Examples of the button 1090 include a home button for causing transition of contents displayed on the display screen to a home position screen, a power on-off button for powering on/off the portable terminal 1000, and a volume button for adjusting the sound level.

The acceleration sensor 1100 detects the direction and the size of an acceleration of the portable terminal 1000. The direction sensor 1110, which may also be called a magnetic bearing sensor, detects an orientation of the portable terminal 1000 by measuring terrestrial magnetism. The gyroscope 1120 detects a posture of the portable terminal 1000.

The acceleration sensor 1100, the direction sensor 1110, and the gyroscope 1120 provide respective detection results, so that a change in location and posture of the portable terminal 1000 can be detected by combining these detection results.

The NFC reader/writer 1130 is a device provided to read information recorded in an NFC tag and to write information into an NFC tag. For example, when the portable terminal 1000 is brought close to an NFC tag targeted for reading or writing to be within a predetermined distance, a communication session is established, so that the NFC reader/writer 1130 reads or writes information from or into this NFC tag.

The hardware configuration of the portable terminal 1000 illustrated in FIG. 2 is an example, and can be modified as appropriate within a scope not compromising the gist of the present invention. Further, the controller 1010 performs necessary control on the portable terminal 1000, according to detection results from the components such as the touch-screen display 1080, the button 1090, and the acceleration sensor 1100.

Figure 3:
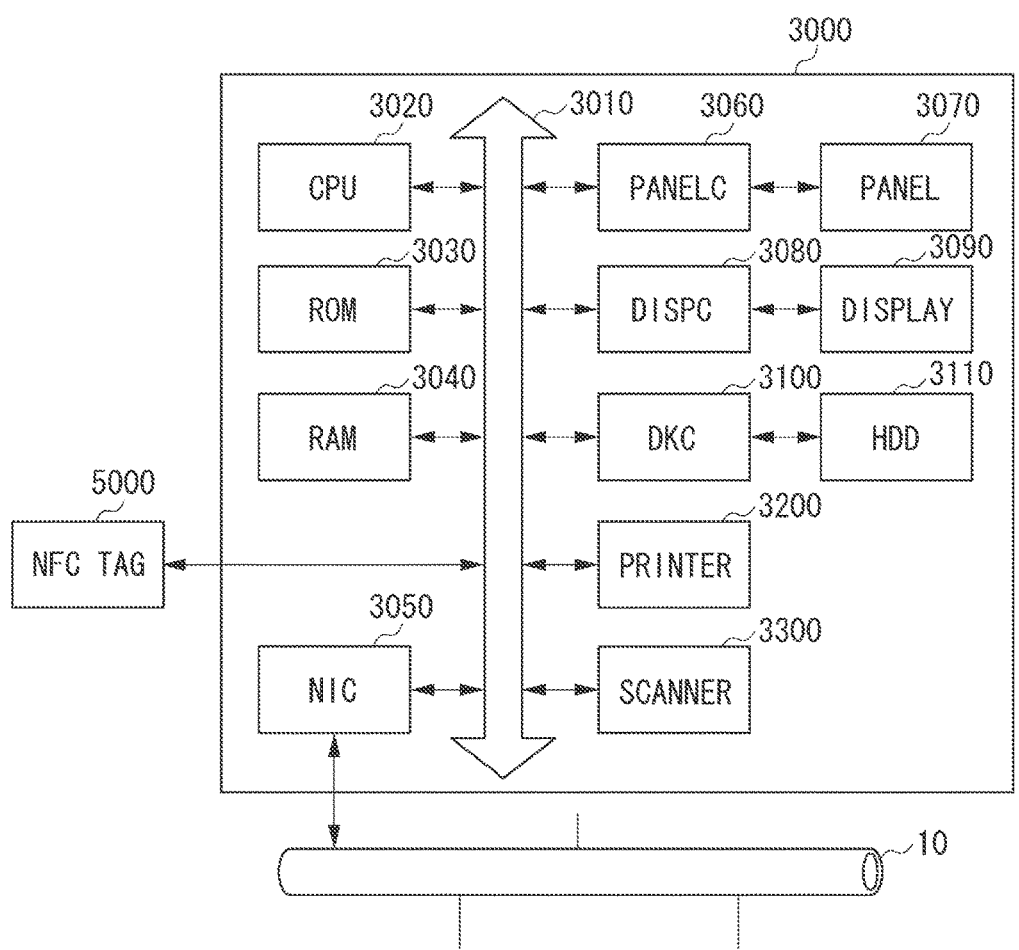
FIG. 3 is a block diagram illustrating an example of a hardware configuration of a multifunction peripheral (MFP).

FIG. 3 is a block diagram illustrating an example of the hardware configuration of the MFP 3000.

The MFP 3000 illustrated in FIG. 3 includes a system bus 3010, a CPU 3020, a read only memory (ROM) 3030, a random access memory (RAM) 3040, a network interface card (NIC) 3050, and an external input controller (PANELC) 3060. The MFP 3000 further includes a touch panel (PANEL) 3070, a display controller (DISPC) 3080, and a display module (DISPLAY) 3090. The MFP 3000 further includes a disk controller (DKC) 3100, a large-scale storage device (a hard disk device (HDD)) 3110, a printer (PRINTER) 3200, and a scanner (SCANNER) 3300.

The NFC tag 5000 is connected to the MFP 3000 via the system bus 3010. Further, the MFP 3000 is connected to the network line 10 via the NIC 3050.

The CPU 3020 comprehensively controls the devices connected to the system bus 3010, by executing various programs stored in the ROM 3030 or the HDD 3110. The RAM 3040 functions as a main memory and a work area for the CPU 3020. In this way, the CPU 3020 functions as one type of computer for implementing various functions of the MFP 3000.

The NIC 3050 mediates bidirectional communication with other devices connected to the network line 10, a file server, or the like. The NIC 3050 can also be configured as a wireless communication module to be connected to the network line 10 via an access point.

The PANELC 3060 is an external input controller, and controls various buttons of the MFP 3000 or operation input received by the PANEL 3070 from a user.

The DISPC 3080 is a display controller, and controls, for example, display of a screen of the display module (DISPLAY) 3090 such as a liquid crystal display. The DKC 3100 is a disk controller, and controls writing and reading of data into and from the large-scale storage device (HDD) 3110 such as a hard disk device.

The PRINTER 3200 is, for example, is a printing unit implemented using electrophotography, and performs printing on a recording material (e.g., a sheet).

The SCANNER 3300 is an image reader provided to read an image of a document. The SCANNER 3300 may be configured to be mounted with an automatic document feeder (ADF) (not illustrated), so that documents of a batch are automatically conveyed one by one.

The HDD 3110 can also be configured to have a predetermined storage area for temporarily storing a read image.

The NFC tag 5000 can record various kinds of information. Examples of these various kinds of information include information for identifying an application to be started automatically in the portable terminal 1000 with which a communication session has been established, and information about a communication-connection changeover, e.g., Wi-Fi handover processing.

Figure 4:
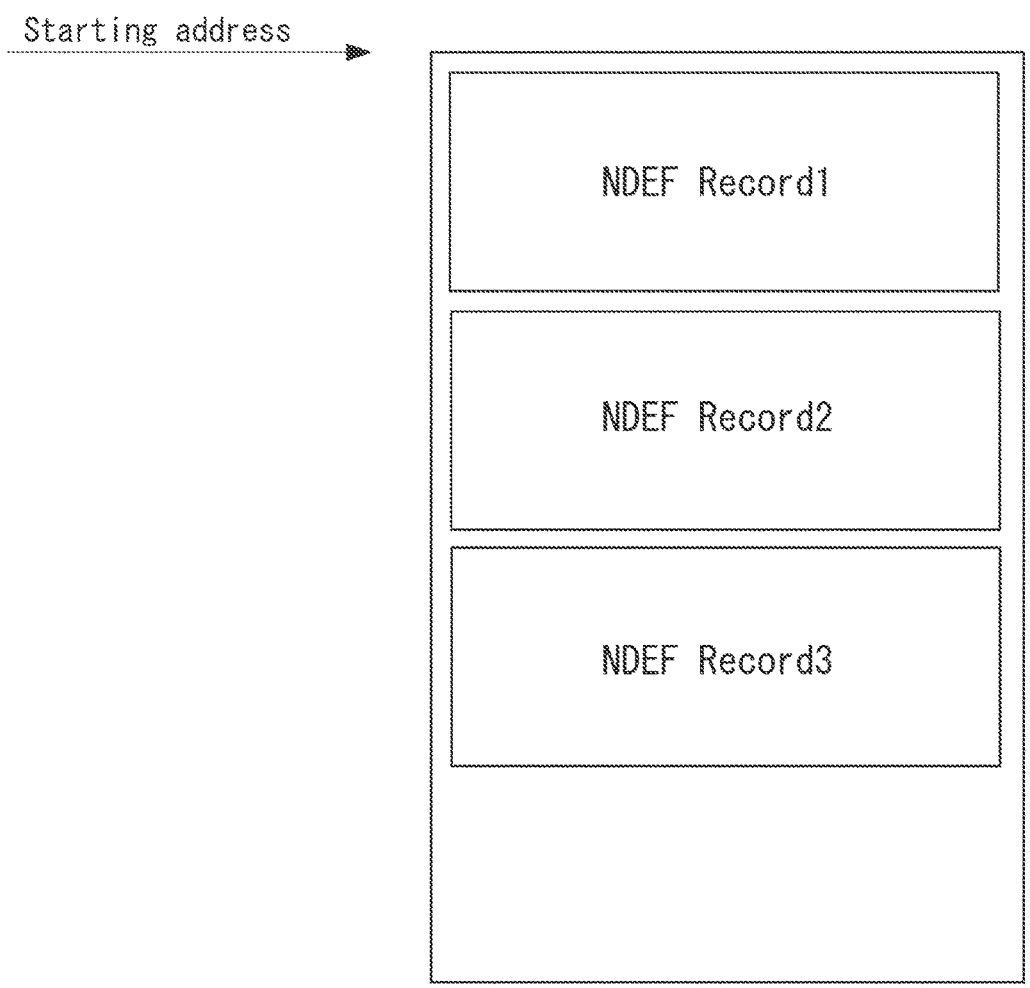
FIG. 4 is a schematic diagram illustrating a memory map of a storage area of a near field communication (NFC) tag.

FIG. 4 is a schematic diagram illustrating a memory map of a storage area of the NFC tag 5000.

The NFC tag 5000 records various kinds of information in a format called NFC Data Exchange Format (NDEF). As illustrated in FIG. 4, for example, there is an NDEF-format record (NFC Record1, NFC Record2, NFC Record3, and so on), and various kinds of information are in sequence recorded from the starting address of the record.

For example, assume that the portable terminal 1000 is brought close to the NFC tag 5000 to be within a distance that allows establishment of a communication session. At this moment, if an application is not started in the portable terminal 1000, the controller 1010 acquires an NDEF record recorded at the starting address of the NFC tag 5000. If an application to be started in the portable terminal 1000 is designated at a uniform resource identifier (URI) scheme of the read NDEF record, the controller 1010 starts the designated application. For example, the application designated by the URI scheme is a MFP application (a first application) for operating the MFP 3000 from the portable terminal 1000 via NFC communication.

Here, the URI scheme indicates a character string representing the location and attribute of an information resource. For example, the URI scheme is described in a form of "xxx://aaa/bbb". In this description "xxx://aaa/bbb", "xxx" indicates the category of an application, "aaa" indicates the name of the application, and "bbb" indicates various parameters of the application.

When an application is already started in the portable terminal 1000, the controller 1010 acquires an NDEF record recorded in a specific area of the NFC tag 5000 according to the started application. The started application executes processing according to contents of the acquired NDEF record.

Figure 5A:
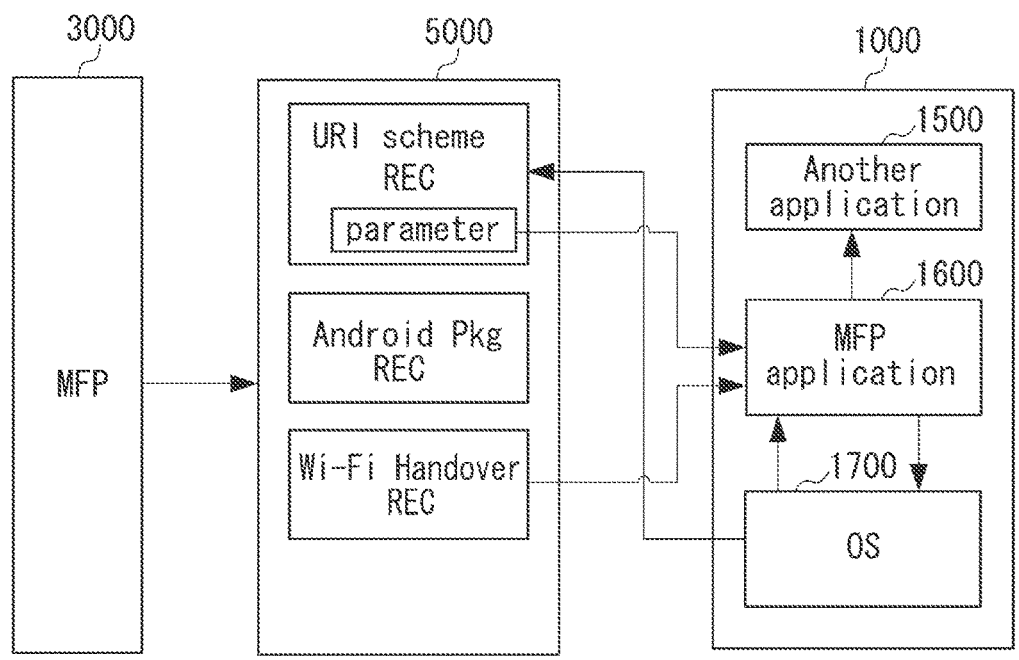
FIG. 5A is a diagram illustrating an outline of a software configuration of the entire information-processing system.
Figure 5B:
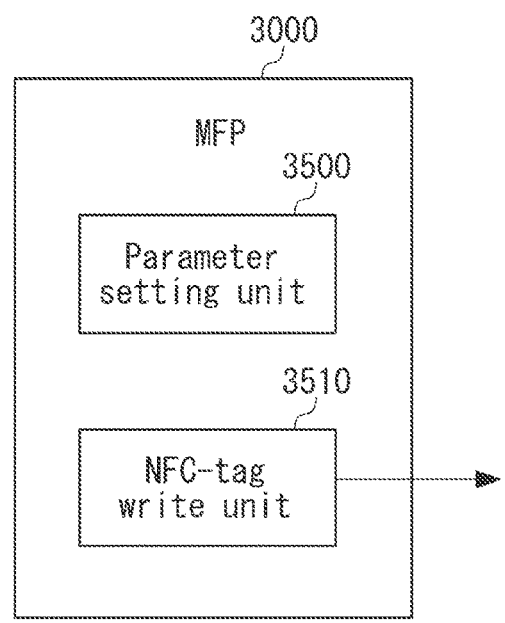
FIG. 5B is a diagram illustrating an example of a software configuration of the MFP.
Figure 5C:
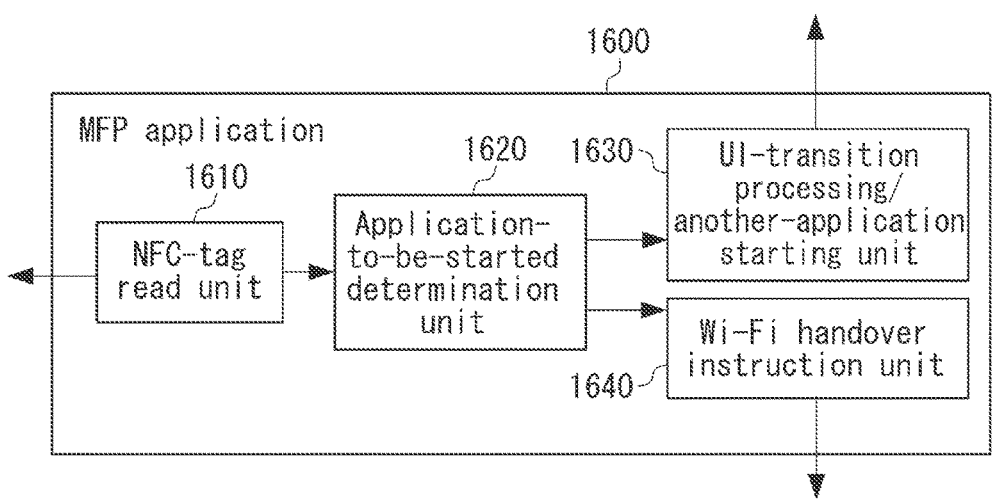
FIG. 5C is a diagram illustrating an example of a software configuration of the portable terminal.

FIGS. 5A, 5B, and 5C are diagrams illustrating an example of a software configuration of the information-processing system S.

Specifically, FIG. 5A illustrates an outline of a software configuration of the entire information-processing system S. FIG. 5B illustrates an example of a software configuration of the MFP 3000. FIG. 5C illustrates an example of a software configuration of the portable terminal 1000.

As illustrated in FIG. 5A, information including an URI scheme for specifying the start of the MFP application is stored in an NDEF record (a URI scheme REC) at the starting address of the NFC tag 5000. Android (registered trademark) package information is stored in the next NDEF record (an Android Pkg REC). Information (e.g., an Internet Protocol (IP) address, and access-point information) for the Wi-Fi handover processing is stored in the next NDEF record (a Wi-Fi Handover REC).

When a communication session between the MFP 3000 and the portable terminal 1000 is being established, the controller 1010, which executes an OS 1700 and a MFP application 1600, acquires each piece of information recorded in the NFC tag 5000. Specifically, the controller 1010 acquires the information stored in each of the NDEF records.

The controller 1010 acquires the information from the URI scheme REC by executing the OS 1700, and starts the MFP application 1600 designated to be started. The controller 1010 executing the MFP application 1600 acquires each of a parameter of the URI scheme REC and the information stored in the Wi-Fi Handover REC. The controller 1010 starts another application 1500 (a second application), based on these pieces of acquired information. FIG. 5A illustrates relationships between transmission and reception of such information by using arrows, by way of example.

Each function unit illustrated in FIG. 5B is implemented when the CPU 3020 executes software stored in the ROM 3030.

A parameter setting unit 3500 specifies information to be written in the NFC tag 5000. Specifically, the parameter setting unit 3500 specifies information about a user interface (UI) screen to be displayed on the display screen of the portable terminal 1000 and the Wi-Fi handover processing. The parameter setting unit 3500 sets the specified information as a parameter of the URI scheme REC.

Here, for example, if a function to be executed by the MFP 3000 is FAX reception, the UI screen to be displayed on the display screen of the portable terminal 1000 is a FAX reception screen for operation of the FAX reception. Further, in order to display this UI screen on the display screen of the portable terminal 1000, it may become necessary to start another application (e.g., a FAX viewer application) different from the MFP application. In other words, when the UI screen is identified, another application to be started in the portable terminal 1000 is also identified. The details will be described using FIG. 8.

The information about the Wi-Fi handover processing is determined based on information such as an IP address set in the MFP 3000, a service set identifier (SSID) of an access point to which the MFP 3000 is to be connected, a SSID of an access point designated beforehand by a user, or the like.

The user can also designate the UI screen to be displayed on the display screen of the portable terminal 1000. Moreover, for example, a UI screen automatically distinguished based on the model name or the like of the MFP 3000 can also be displayed.

An NFC-tag writing unit 3510 writes the parameter set by the parameter setting unit 3500, in the NFC tag 5000. The NFC-tag writing unit 3510 writes information about the UI screen (screen information), as a parameter of the URI scheme REC illustrated in FIG. 5A. For example, assume that the application to be started is the MFP application and the UI screen to be displayed on the display screen of the portable terminal 1000 is "aaa". In this case, "xxx://MFPapplication/aaa" having "aaa" as a parameter is written in the URI scheme REC as the information. Further, the NFC-tag writing unit 3510 writes handover information such as the information about the Wi-Fi handover processing, in the Wi-Fi Handover REC illustrated in FIG. 5A. In other words, the application information is recorded in the URI scheme REC, and the handover information is recorded in the Wi-Fi Handover REC.

Each function unit illustrated in FIG. 5C is implemented when the controller 1010 executes the MFP application 1600 that is software stored in the storage 1070.

The first record of the NFC tag 5000 is read upon establishment of a communication session with the NFC tag 5000. For example, when the URI scheme REC illustrated in FIG. 5A includes information indicating start of the MFP application 1600 illustrated in FIG. 5A, this MFP application 1600 is started.

An NFC-tag reading unit 1610 reads various kinds of information recorded in the storage area of the NFC tag 5000. Specifically, the NFC-tag reading unit 1610 reads the parameter of the URI scheme REC, and each piece of information in the Wi-Fi Handover REC.

An application-to-be-started determination unit 1620 determines whether it is necessary to perform a communication-connection changeover (a changeover to Wi-Fi communication), in another application to be started according to the acquired parameter. When the application-to-be-started determination unit 1620 determines that the changeover to the Wi-Fi communication is necessary, a Wi-Fi handover instruction unit 1640 instructs the controller 1010 to execute the Wi-Fi handover processing.

A UI-transition processing/another-application starting unit 1630 instructs the controller 1010 to execute transition to the UI screen designated by the parameter or start of the another application designated by the parameter. This another application is, for example, the another application 1500 illustrated in FIG. 5A.

A specific processing procedure will be described in detail below using FIGS. 6 to 8.

Figure 6:
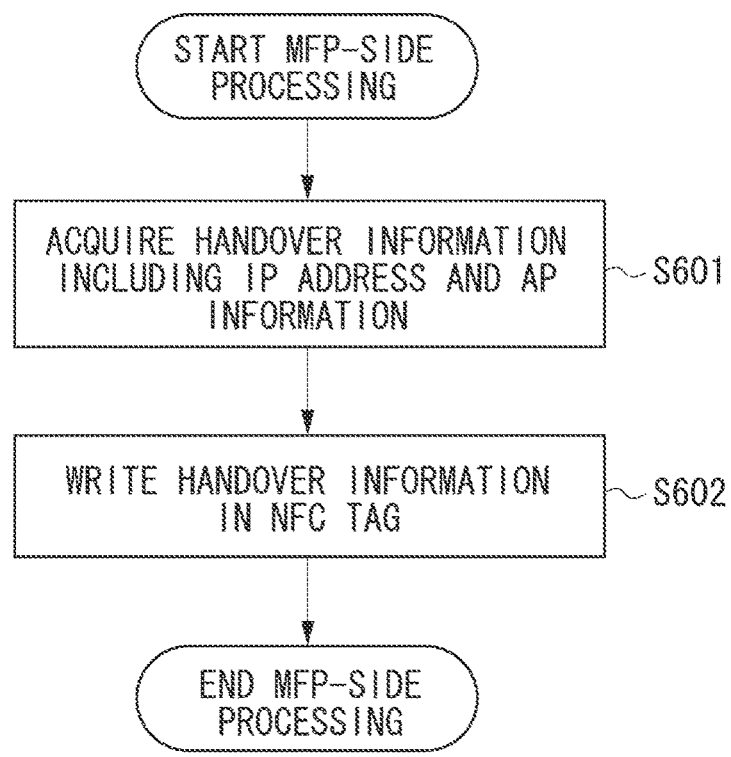
FIG. 6 is a flowchart illustrating a processing procedure of the MFP.

FIG. 6 is a flowchart illustrating a processing procedure of the MFP 3000. The CPU 3020 reads a predetermined program stored in the ROM 3030 and executes the read program, to implement each process illustrated in FIG. 6.

In step S601, the CPU 3020 acquires the information about the Wi-Fi handover processing such as the IP address of the MFP 3000 and the SSID of an access point, upon activation of the MFP 3000. Further, the CPU 3020 acquires the screen information about a UI screen to be displayed on the display screen of the portable terminal 1000. The CPU 3020 temporarily records these pieces of acquired information in the RAM 3040, for example.

In step S602, the CPU 3020 writes the acquired Wi-Fi handover information in the Wi-Fi Handover REC. Further, the CPU 3020 writes the acquired screen information as a parameter of the URI scheme REC. In other words, these pieces of information are recorded in the NFC tag 5000. Afterwards, the CPU 3020 completes this series of processes.

Figure 7:
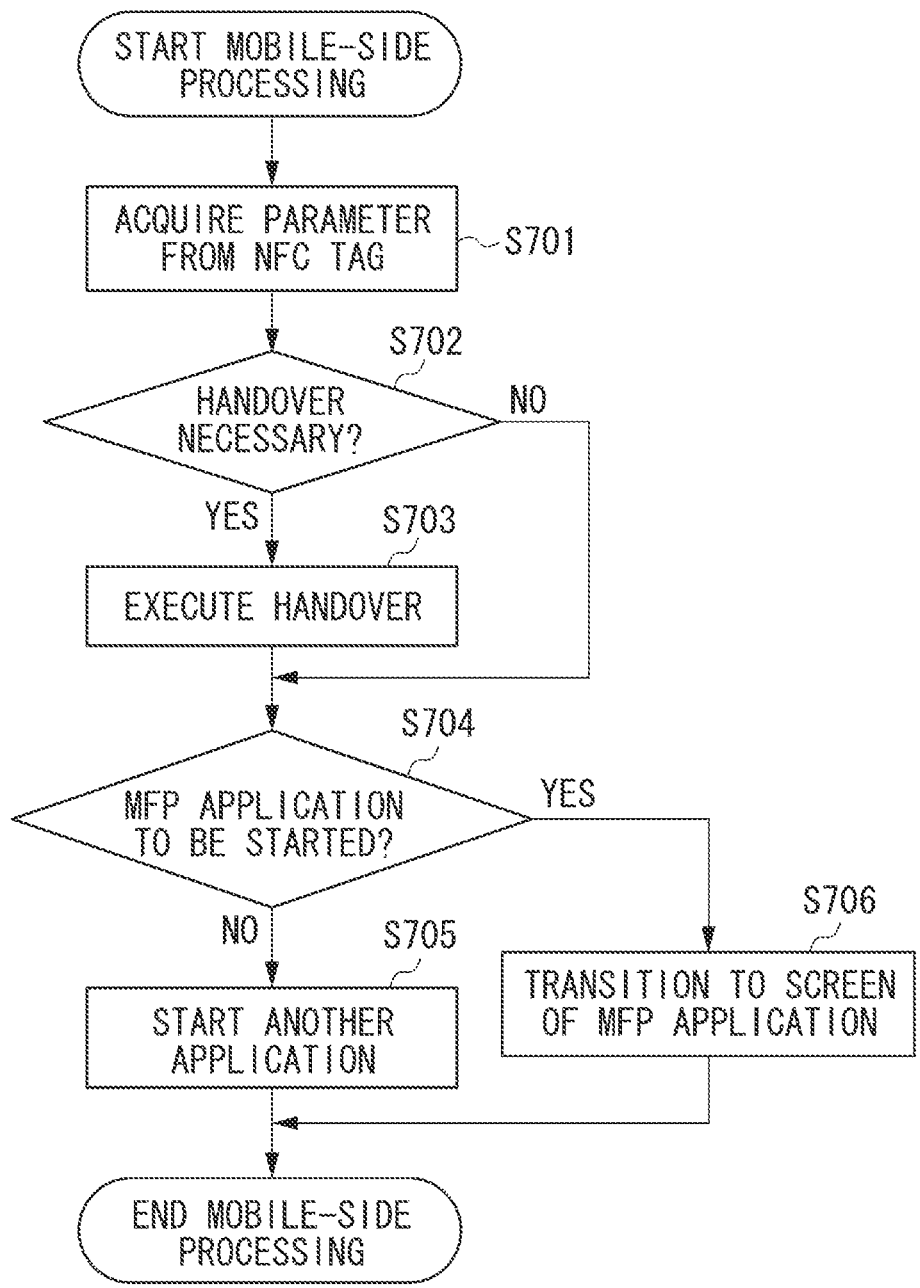
FIG. 7 is a flowchart illustrating a processing procedure of the portable terminal.

FIG. 7 is a flowchart illustrating a processing procedure of the portable terminal 1000. FIG. 8 is a diagram illustrating an example of a data table held by the MFP application 1600.

This data table associates the UI screen (Display UI) to be displayed on the display screen of the portable terminal 1000, the application (Application to be started) to be started as another application, and whether the Wi-Fi handover processing is necessary, with one another. Further, each process illustrated in FIG. 7 is implemented when the controller 1010 executes the MFP application 1600.

Upon establishment of a communication session with the NFC tag 5000, the controller 1010 reads the URI scheme REC recorded in the NFC tag 5000. The controller 1010 then starts the MFP application 1600, if the URI scheme REC includes the information indicating the start of the MFP application 1600.

In step S701, the controller 1010 acquires the parameter stored in the URI scheme REC of the NFC tag 5000.

In step S702, the controller 1010 determines a display UI, an application to be started, and whether the Wi-Fi handover processing is necessary, by referring to the data table (FIG. 8), based on the parameter acquired in the process in step S701.

For example, when the display UI identified based on the parameter and the data table is "Remote UI (RUI)" (see FIG. 8; this is a webpage possessed by the MFP 3000), the controller 1010 determines that the application to be started (another application) is "Browser" and the Wi-Fi handover processing is necessary. Alternatively, when the display UI identified by the parameter is "FAX transmission" (FIG. 8), the application to be started is the MFP application 1600. In this case, since the MFP application 1600 is already executed, the controller 1010 instructs the MFP 3000 to execute fax transmission, by the NFC communication of the MFP application 1600. Therefore, the Wi-Fi handover processing is unnecessary.

If the controller 1010 determines that the Wi-Fi handover processing is necessary (Yes in step S702), then in step S703, the controller 1010 executes the Wi-Fi handover processing. In this case, the controller 1010 performs a communication-connection changeover from the NFC communication to the Wi-Fi communication. Otherwise (No in step S702), the processing proceeds to step S704.

In step S704, the controller 1010 determines whether the application to be started is the MFP application 1600. In step S706, when the application to be started is the MFP application 1600 (Yes in step S704), a screen displayed on the touch-screen display 1080 transitions to the screen according to the parameter. If not (No in step S704), then in step S705, the controller 1010 starts another application designated by the parameter, which completes this series of processes.

In this way, in the information-processing system S of the present exemplary embodiment, it is determined whether a communication-connection changeover is necessary for another application to be started after start of the MFP application 1600 in the portable terminal 1000, to display the UI screen according to the parameter. If the communication-connection changeover is necessary, the portable terminal 1000 starts another application after performing the communication-connection changeover to the corresponding type of communication.

Therefore, there is no need for a user to manually perform a communication-connection changeover to Wi-Fi communication or the like, after starting, for example, a third-party-produced application that is another application. In other words, it is possible to reduce complicated user work such as an application changeover according to processing contents and a communication-connection changeover due to the application changeover. As a result, the user can quickly perform desired operation, which can improve usability.

Moreover, it is not necessary to add a program for a communication-connection changeover processing to each of other applications. As a result, an increase in application size is suppressed, which can in turn suppress requiring a large part of the capacity of a storage device in a portable terminal.

A second exemplary embodiment will be described using a case adopting such a configuration that a status of the MFP 3000 is written as a parameter and another application is determined based on this parameter. The same configuration as the configuration already described in the first exemplary embodiment will be not described. The second exemplary embodiment is different from the first exemplary embodiment, mainly in terms of processing for determining a UI screen to be displayed on a display screen of a portable terminal 1000.

A parameter setting unit 3500 according to the present exemplary embodiment sets information about a device status and a UI status representing a status of an MFP 3000, as a parameter. Examples of the device status include a state where a document is laid on an ADF and a state where one or more secure jobs are received by the MFP 3000. The UI status is a status of the UI screen exemplified by a FAX transmission screen, a setting screen of the MFP 3000, and a remote scan screen, displayed on a DISPLAY 3090.

An NFC-tag writing unit 3510 according to the present exemplary embodiment writes the parameter set by the parameter setting unit 3500 in an NFC tag 5000. For example, "xxx://MFPapplication/Job=ADF&UI=Scan" is written in a URI scheme REC as information, when a document is laid on the ADF and the remote scan screen is displayed on the DISPLAY 3090. A specific processing procedure will be described in detail below, using FIGS. 9 to 11.

Figure 9:
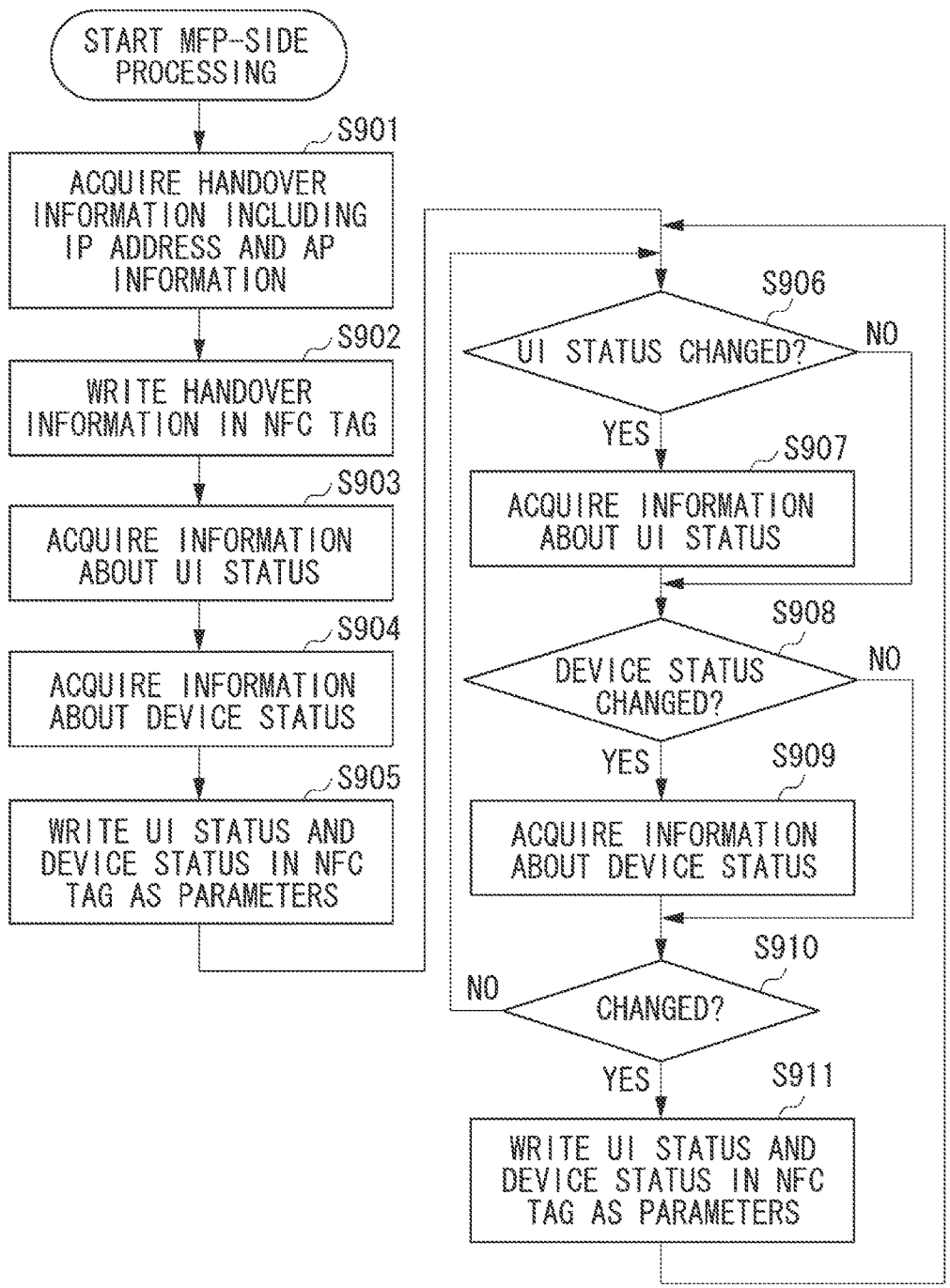
FIG. 9 is a flowchart illustrating a processing procedure of an MFP according to a second exemplary embodiment.

FIG. 9 is a flowchart illustrating a processing procedure of the MFP 3000 according to the present exemplary embodiment. In the present exemplary embodiment, an area (JobStatus) for storing information about a job status and an area (UIStatus) for storing information about a UI status are each secured as a work area on a RAM 3040.

In step S901, a CPU 3020 acquires Wi-Fi handover information such as an IP address of the MFP 3000 and a SSID of an access point, upon activation of the MFP 3000.

In step S902, the CPU 3020 writes the acquired Wi-Fi handover information in a Wi-Fi Handover REC.

In step 903, the CPU 3020 acquires the information about the UI status. In step 904, the CPU 3020 acquires the information about the device status.

In step 905, the CPU 3020 writes the acquired information about the UI status and the acquired information about the device status as parameters of the URI scheme REC. In other words, these pieces of information are recorded in the NFC tag 5000.

In step 906, the CPU 3020 determines whether there is a change in the UI status. Specifically, the CPU 3020 can make this determination by comparing the last UI status written as a parameter of the URI scheme REC, with the current UI status. If there is a change (Yes in step S906), then in step 907, the CPU 3020 acquires the information about the UI status at the time of the change, and stores this information in the UIStatus. Otherwise (No in step S906), the processing proceeds to step S908.

In step 908, the CPU 3020 determines whether there is a change in the device status. Specifically, the CPU 3020 can make this determination by comparing the last device status written as a parameter of the URI scheme REC, with the current device status. If there is a change (Yes in step S908), then in step 909, the CPU 3020 acquires the information about the device status at the time of the change, and stores this information in the JobStatus. Otherwise (No in step S908), the processing proceeds to step S910.

In step 910, the CPU 3020 determines whether there is a change in at least one of the UI status and the device status. Specifically, if the information is stored in at least one of the UIStatus and the JobStatus, the CPU 3020 determines that there is a change.

When the CPU 3020 determines that there is no change (No in step S910), the processing returns to step S906. If there is a change (Yes in step S910), then in step 911, the CPU 3020 writes the information stored in at least one of the UIStatus and the JobStatus, as a parameter of the URI scheme REC. After step S911, the CPU 3020 clears the UIStatus and the JobStatus, and the processing returns to step S906. In this way, the status information of the MFP 3000 is updated to the newest information.

Figure 10:
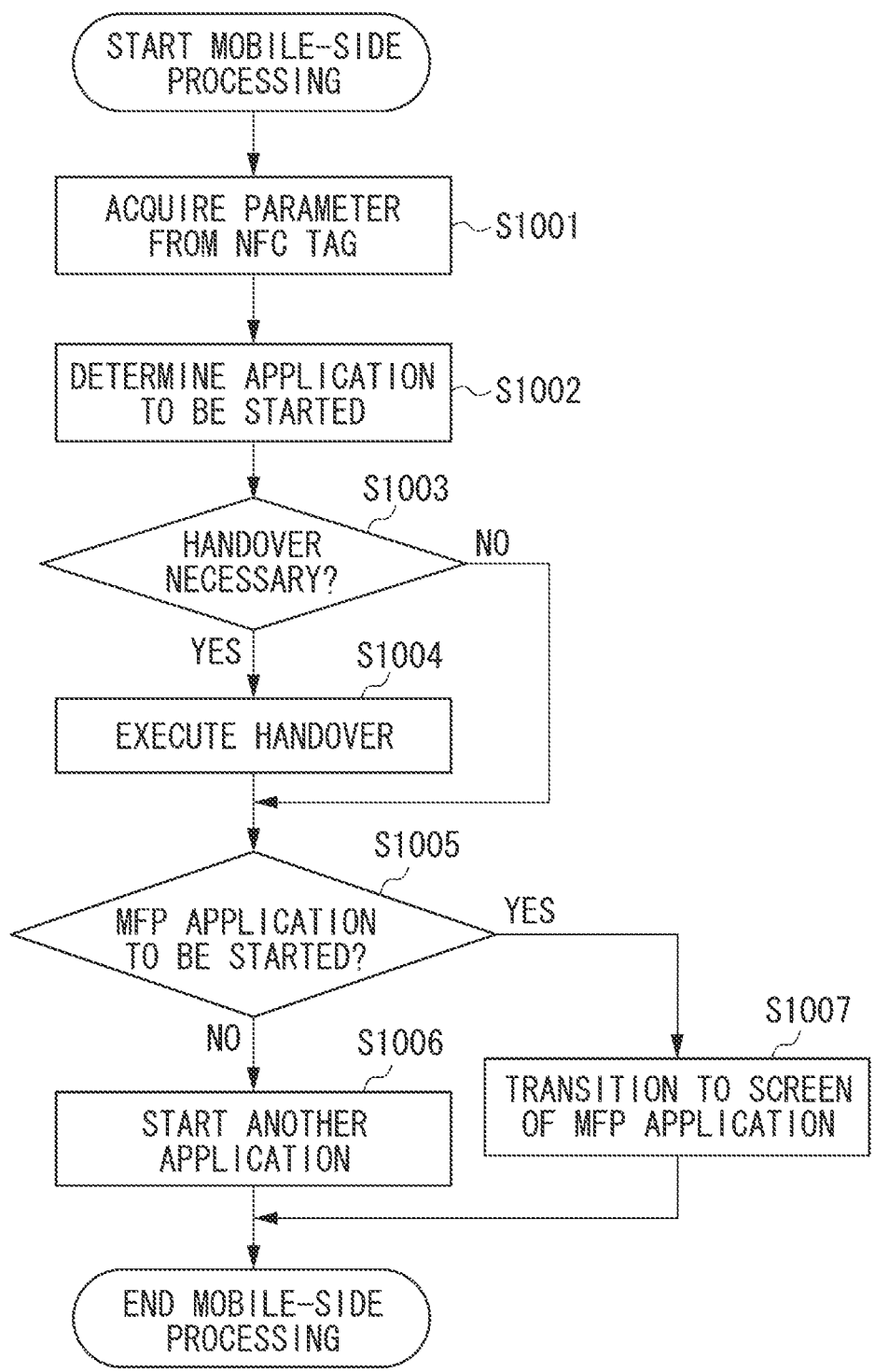
FIG. 10 is a flowchart illustrating a processing procedure of a portable terminal.

FIG. 10 is a flowchart illustrating a processing procedure of the portable terminal 1000 according to the present exemplary embodiment. FIG. 11 is a diagram illustrating an example of a data table held by a MFP application 1600 according to the present exemplary embodiment. This data table associates the device status, the UI status, and the UI screen (display UI) to be displayed on a display screen of the portable terminal 1000 via the MFP application 1600, with one another.

What is different from the processing procedure in the flowchart illustrated in FIG. 7 is that this flowchart illustrated in FIG. 10 includes a process in step S1002. The description will be given below focusing on this process in step S1002.

In step 1002, a controller 1010 determines a display UI based on a parameter acquired in step S1001, by referring to the data table (FIG. 11).

For example, when a device status identified based on the parameter and the data table is "ADF document present" and the UI status is "Remote scan screen", the controller 1010 can determine that a user is about to perform a scan in the MFP 3000. Therefore, the display UI is determined to be "Scan".

Next, in step 1003, the controller 1010 determines an application to be started and whether the Wi-Fi handover processing is necessary, by referring to the data table (FIG. 8), based on the display UI determined in the process of step S1002. Each process in or after step S1004 is similar to the process in the first exemplary embodiment.

In this way, in the information-processing system of the present exemplary embodiment, the information representing the status of the MFP 3000 is specified as the status information (the device status and the UI status). Based on this status information, a second application to be started after start of a first application is identified.

Therefore, corresponding to processing to be performed by a user in the MFP 3000, a UI screen can be displayed on the display screen of the portable terminal 1000. In other words, an application to be started in the portable terminal 1000 is identified based on the information about the device status and the UI status.

Accordingly, it is possible to reduce complicated user work, such as an application changeover according to processing contents and a communication-connection changeover due to the application changeover. As a result, a user can quickly perform desired operation, which can improve usability.

The above-described exemplary embodiments are intended to describe the present invention specifically, without limiting the scope of the present invention. The present invention includes various forms not deviating from the gist of the present invention. For example, the above-described exemplary embodiments may be partially combined as appropriate.

According to the present exemplary embodiments, a necessary communication-connection changeover is performed before start of the second application. Therefore, it is possible to reduce complicated user work, such as an application changeover according to processing contents and a communication-connection changeover due to the application changeover. As a result, a user can quickly perform desired operation, which can improve usability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A system comprising:
a printing apparatus; and
a portable terminal having a plurality of applications including at least a first application and a second application,
wherein the printing apparatus comprises,
a display,
an NFC tag, and
a writing unit configured to write first information in the NFC tag;
a control unit configured to control a writing operation of the writing unit;
wherein the control unit controls the writing operation of the writing unit such that first information is stored in the NFC tag upon a condition that a status of the printing apparatus is a first status, and such that second information is stored in the NFC tag upon a condition that the status of the printing apparatus is a second status different from the first status,
wherein the portable terminal comprises,
an acquisition unit configured to acquire information from the NFC tag, and
an activation unit configured to automatically activate the first application when the information acquired from the NFC tag by the acquisition unit is the first information, and to automatically activate the second application when the information acquired from the NFC tag by the acquisition unit is the second information.

2. The system according to claim 1, wherein
the plurality of applications includes at least a browser application, and
in a case where the information acquired by the acquisition unit is the first information, the activation unit automatically activates the browser application.

3. The system according to claim 2, wherein
the plurality of applications includes at least a fax application corresponding to a fax function, and
wherein in a case where the information acquired by the acquisition unit is the second information, the activation unit automatically activates the fax application.

4. The system according to claim 2, wherein
the plurality of applications includes at least a scan application, and
in a case where the information acquired by the acquisition unit is the second information, the activation unit automatically activates the scan application.

5. The system according to claim 1, wherein the second status is a status that a document is laid on an auto document feeder of the printing apparatus.

6. A control method for controlling a printing apparatus which comprises a display and an NFC tag, and which is able to communicate with a portable terminal having a plurality of applications including at least a first application and a second application, the control method comprising:
writing information in the NFC tag; and
activating an application of the portable terminal that is determined based on information acquired from the NFC tag,
wherein, by writing the information in the NFC tag, first information is stored in the NFC tag upon a condition that a status of the printing apparatus is a first status and second information is stored in the NFC tag upon a condition that a status of the printing apparatus is a second status different from the first status,
wherein the first application of the portable terminal is automatically activated when information acquired from the NFC tag by the portable terminal is the first information; and
wherein the second application of the portable terminal is automatically activated when the information acquired from the NFC tag by the portable terminal is the second information.

7. The system according to claim 1,
wherein the control unit further controls the writing operation of the writing unit such that screen information is written in the NFC tag in response to a change of a screen to be displayed on an operation unit of the printing apparatus, and
wherein the control unit controls the writing operation of the writing unit such that first screen information is stored as screen information to be stored in the NFC tag upon a condition that a first screen is displayed on the operation unit and such that second screen information is stored as the screen information to be stored in the NFC tag upon a condition that the a second screen is displayed on the operation unit, wherein the activation unit automatically activates the first application if the acquisition unit acquires both of the first information and the first screen information, and wherein the activation unit automatically activates the second application if the acquisition unit acquires both of the second information and the second screen information.

8. The control method according to claim 6, wherein the plurality of applications includes at least a browser application, and wherein the first application is the browser application and the browser application of the portable terminal is automatically activated when the information acquired from the NFC tag by the portable terminal is the first information.

9. The control method according to claim 8, wherein the plurality of applications includes at least a fax application corresponding to a fax function, and wherein the second application is the fax application, and the fax application of the portable terminal is automatically activated when the information acquired from the NFC tag by the portable terminal is the second information.

10. The control method according to claim 8, wherein the plurality of applications includes at least a scan application, and wherein the second application is the scan application and the scan application of the portable terminal is automatically activated when the information acquired from the NFC tag by the portable terminal is the second information.

11. The control method according to claim 6, wherein the second status is a status that a document is laid on an auto document feeder of the printing apparatus.

* * * * *